United States Patent [19]

Smith

[11] Patent Number: 5,775,914
[45] Date of Patent: Jul. 7, 1998

[54] DRAWING APPARATUS

[76] Inventor: Peter McCormack Smith, 4319 Saltillo St., Woodland Hills, Calif. 91364

[21] Appl. No.: 728,965

[22] Filed: Oct. 11, 1996

[51] Int. Cl.$^6$ ............................................. G09B 11/00
[52] U.S. Cl. .................................. 434/85; 434/84
[58] Field of Search ................. 434/84, 85, 408, 434/409, 410, 81

[56] References Cited

U.S. PATENT DOCUMENTS

| | | | |
|---|---|---|---|
| 2,881,538 | 4/1959 | Lewis | 434/408 |
| 3,114,597 | 12/1963 | Joslyn | 434/410 |
| 3,512,273 | 5/1970 | Baker, Jr. et al. | 434/410 |
| 4,875,953 | 10/1989 | Lloyd | 434/84 |
| 5,006,000 | 4/1991 | House | 434/409 |
| 5,106,305 | 4/1992 | Grant | 434/84 |
| 5,141,438 | 8/1992 | Spector | 434/85 |
| 5,163,846 | 11/1992 | Lee | 434/85 |
| 5,252,073 | 10/1993 | Brotz | 434/84 |
| 5,324,202 | 6/1994 | Meyers et al. | 434/410 |

FOREIGN PATENT DOCUMENTS 1046725  10/1966  Canada .................................. 434/84

*Primary Examiner*—Paul J. Hirsch

[57] ABSTRACT

A drawing apparatus including a frame portion. A liquid membrane is positionable within the frame portion. A planar portion is positionable within the frame portion below the liquid membrane. A drawing implement is used to press down on the liquid membrane to move a black pliable liquid around to expose images on the planar portion.

4 Claims, 2 Drawing Sheets

DRAWING APPARATUS

BACKGROUND OF THE INVENTION

1. Field of the Invention

The present invention relates to a drawing apparatus and more particularly pertains to pushing a fluid around to expose various shapes and colors with a drawing apparatus.

2. Description of the Prior Art

The use of silkscreen processes is known in the prior art. More specifically, silkscreen processes heretofore devised and utilized for the purpose of producing designs are known to consist basically of familiar, expected and obvious structural configurations, notwithstanding the myriad of designs encompassed by the crowded prior art which have been developed for the fulfillment of countless objectives and requirements.

By way of example. U.S. Pat. No. 5,174,203 to Maeda discloses a multi-color silk screen printing method.

U.S. Pat. No. 5,174,204 to Meier et al. discloses a method of producing decorative designs and articles produced thereby.

U.S. Pat. No. 4,869,165 to Louiche discloses a silkscreen process for producing a design and proximate inscription.

U.S. Pat. No. 4,652,464 to Ludlum et al. discloses printing fine art with fluorescent and non-fluorescent colorants.

U.S. Pat. No. Des. 319,541 to Stewart discloses the ornamental design for a picture frame or similar article.

While these devices fulfill their respective, particular objective and requirements, the aforementioned patents do not describe a drawing apparatus for pushing a fluid around to expose various shapes and colors.

In this respect, the drawing apparatus according to the present invention substantially departs from the conventional concepts and designs of the prior art, and in doing so provides an apparatus primarily developed for the purpose of pushing a fluid around to expose various shapes and colors.

Therefore, it can be appreciated that there exists a continuing need for new and improved drawing apparatus which can be used for pushing a fluid around to expose various shapes and colors. In this regard, the present invention substantially fulfills this need.

SUMMARY OF THE INVENTION

In the view of the foregoing disadvantages inherent in the known types of silkscreen processes now present in the prior art, the present invention provides an improved drawing apparatus. As such, the general purpose of the present invention, which will be described subsequently in greater detail, is to provide a new and improved drawing apparatus and method which has all the advantages of the prior art and none of the disadvantages.

To attain this, the present invention essentially comprises a frame portion having a generally rectangular configuration. The frame portion has two long side portions and two short side portions. The frame portion has an upper portion, an indented intermediate portion and a further indented lower portion. The apparatus includes a liquid membrane having a generally rectangular configuration. The liquid membrane comprises an outer plastic casing encapsulating a black pliable liquid therein. The liquid membrane is positionable within the indented intermediate portion of the frame portion. The apparatus includes a multi-color planar portion having a generally rectangular configuration. The planar portion has an upper surface. The upper surface has a plurality of patterns and colors disposed thereon. The multi-color planar portion is positionable within the further indented lower portion of the frame portion below the liquid membrane. The apparatus includes a drawing implement comprised of a blunt object.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved drawing apparatus which has all the advantages of the prior art silkscreen processes and none of the disadvantages.

It is another object of the present invention to provide a new and improved drawing apparatus which may be easily and efficiently manufactured and marketed.

It is a further object of the present invention to provide a new and improved drawing apparatus which is of durable and reliable construction.

An even further object of the present invention is to provide a new and improved drawing apparatus which is susceptible of a low cost of manufacture with regard to both materials and labor, and which accordingly is then susceptible of low prices of sale to the consuming public, thereby making such a drawing apparatus economically available to the buying public.

Still yet another object of the present invention is to provide a new and improved drawing apparatus which provides in the apparatuses and methods of the prior art some of the advantages thereof, while simultaneously overcoming some of the disadvantages normally associated therewith.

Even still another object of the present invention is to provide a new and improved drawing apparatus for pushing a fluid around to expose various shapes and colors.

Lastly, it is an object of the present invention to provide a new and improved drawing apparatus including a frame portion. A liquid membrane is positionable within the frame portion. A planar portion is positionable within the frame portion below the liquid membrane. A drawing implement is used to press down on the liquid membrane to move a black pliable liquid around to expose images on the planar portion.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
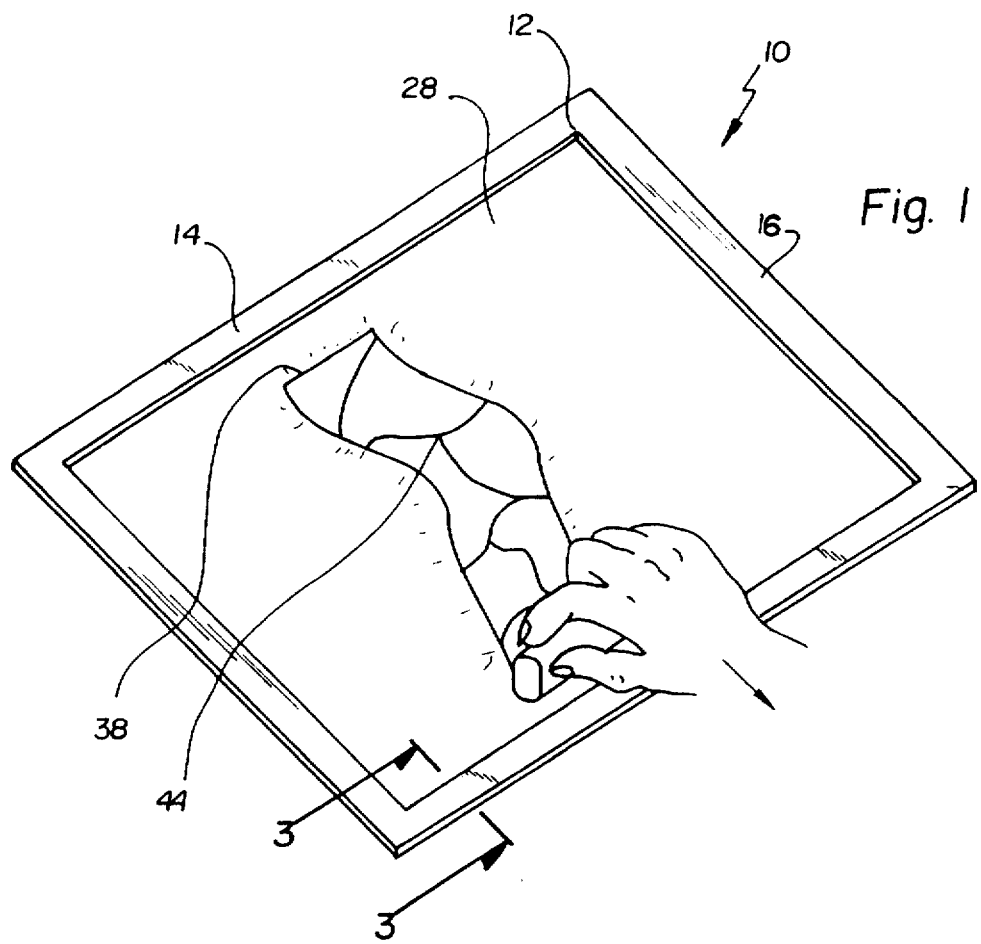
FIG. 1 is a perspective view of the preferred embodiment of the drawing apparatus constructed in accordance with the principles of the present invention.
Figure 2:
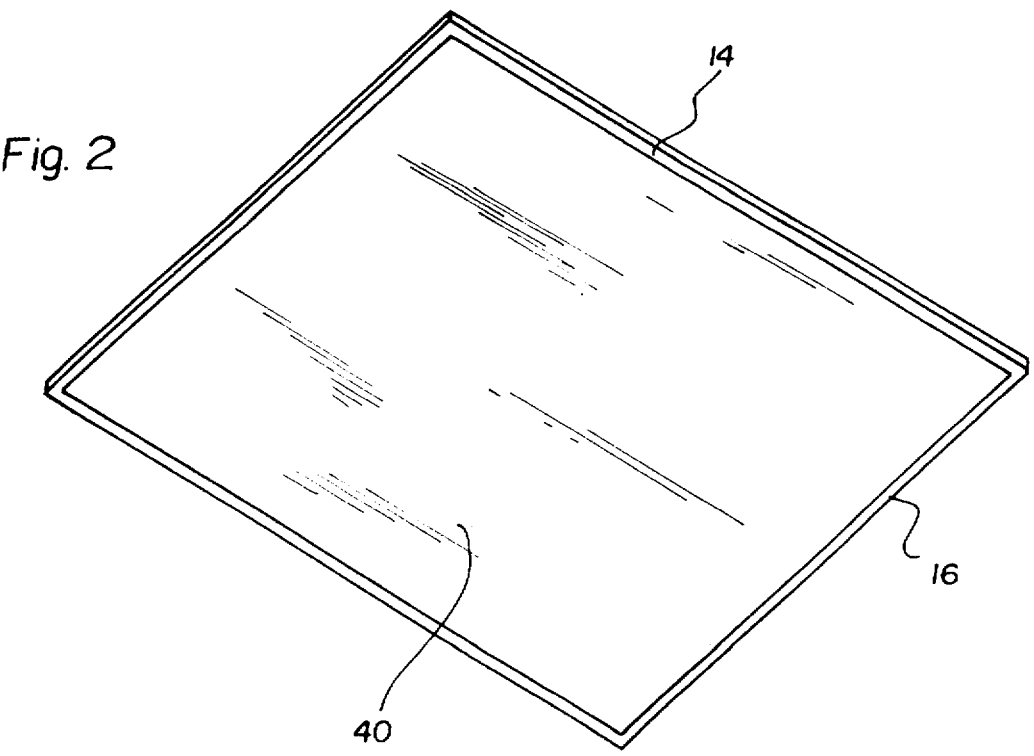
FIG. 2 is a rear perspective view of the present invention.
Figure 3:
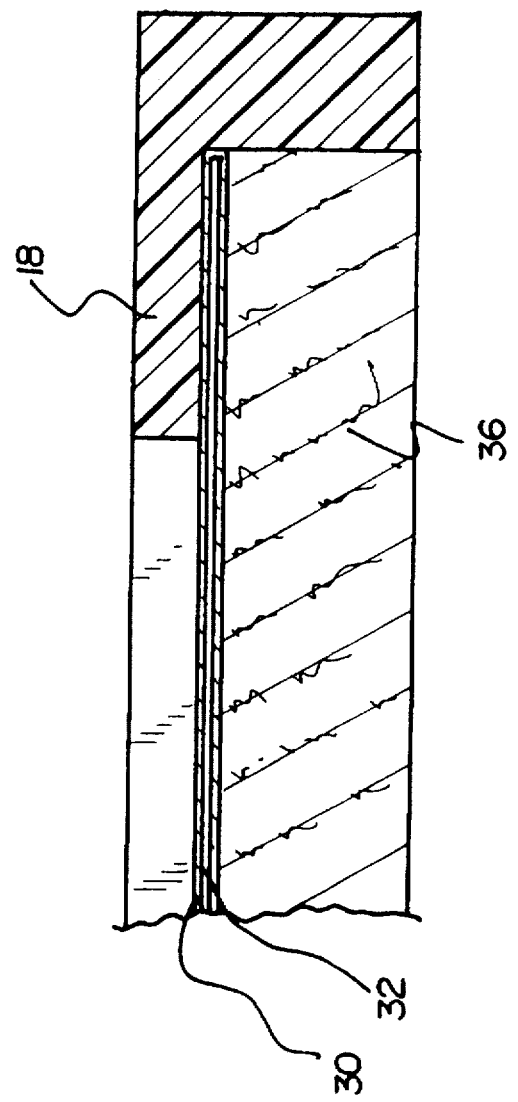
FIG. 3 is a cross-sectional view as taken along line 3—3 of FIG. 1.

With reference now to the drawings, and in particular, to FIGS. 1–6 thereof, the preferred embodiment of the new and improved drawing apparatus embodying the principles and concepts of the present invention and generally designated by the reference number 10 will be described.

Specifically, it will be noted in the various Figures that the device relates to a drawing apparatus for pushing a fluid around to expose various shapes and colors. In its broadest context, the apparatus consists of a frame portion, a liquid membrane, a multi-color planar member and a drawing implement. Such components are individually configured and correlated with respect to each other so as to attain the desired objective.

The apparatus 10 includes a frame portion 12 having a generally rectangular configuration. The frame portion 12 has two long side portions 14 and two short side portions 16. The frame portion 12 has an upper portion 18, an indented intermediate portion 20 and a further indented lower portion 22. The frame portion 12 preferably has a length of sixteen inches and a height of thirteen inches. The dimensions of the frame portion 12 could optionally be increased or decreased.

The apparatus 10 includes a liquid membrane 28 having a generally rectangular configuration. The liquid membrane 28 comprises an outer plastic casing 30 encapsulating a black pliable liquid 32 therein. The liquid membrane 28 is positionable within the indented intermediate portion 20 of the frame portion 12.

The apparatus further includes a multi-color planar portion 36 having a generally rectangular configuration. The planar portion 36 has an upper surface 38 and a lower surface 40. The upper surface 38 has a plurality of patterns and colors 44 disposed thereon. The multi-color planar portion 36 is positionable within the further indented lower portion 22 of the frame portion 12 below the liquid membrane 28.

Lastly, the apparatus 10 includes a drawing implement comprised of a blunt object 54. Note FIG. 1.

In use, the blunt object 54 is used to press down on the liquid membrane 28 to move the black pliable liquid 32 around thereby exposing the plurality of patterns and colors 44 on the planar member. A standard spatula can be used to smooth the pliable liquid 32 for reuse of the apparatus 10. The apparatus 10 provides a reusable drawing surface with no mess.

The present invention is an artistic type of game that consists of a rectangular plastic frame, which holds a vibrant, multi-colored cardboard sheet and a sealed, transparent plastic membrane. Contained in the sealed plastic membrane would be black, non-toxic gelatin-like liquid. With the present invention, parents would no longer have to deal with messy clean-ups, such as spilled paint in the carpet or pieces of crayon or chalk in between wood or other flooring. The present invention would be an excellent toy for travelling, as it would make no noise and require no water (unlike paints). One could even use a fingernail or fingertip to create images and move the liquid beneath the membrane. Future applications for the present invention might include a method for pulling out or removing the original color card and inserting an alternate design.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A drawing apparatus for pushing a fluid around to expose various shapes and colors comprising, in combination:

a frame portion having a generally rectangular configuration, the fame portion having two long side portions and two short side portions, the frame portion having an upper portion, an indented intermediate portion and a further indented lower portion;

a liquid membrane having a generally rectangular configuration, the liquid membrane comprising an outer plastic casing encapsulating a black pliable liquid therein, the liquid membrane removably positionable within the indented intermediate portion of the frame portion;

a multi-color planar portion having a generally rectangular configuration, the planar portion having an upper surface, the upper surface having a plurality of patterns and colors disposed thereon, the planar portion removably positionable within the further indented lower portion of the frame portion below the liquid membrane; and a drawing implement comprised of a blunt object.

2. A drawing apparatus comprising:

a frame portion;

a liquid membrane positionable within the frame portion;

a planar portion positionable within the frame portion below the liquid membrane; and a drawing implement wherein the frame portion has a generally rectangular configuration, the frame portion having an upper portion, an indented intermediate portion and a further indented lower portion.

3. The apparatus as set forth in claim 2 wherein the liquid membrane having a generally rectangular configuration, the liquid membrane comprising an outer plastic casing encapsulating a black pliable liquid therein, the liquid membrane positionable within the indented intermediate portion of the frame portion.

4. The apparatus as set forth in claim 3 wherein the planar portion comprising a multi-color planar portion having a generally rectangular configuration, the planar portion having an upper surface, the planar portion positionable within the further indented lower portion of the frame portion below the liquid membrane.

* * * * *